United States Patent [19]

Cloth

[11] Patent Number: 5,024,400

[45] Date of Patent: Jun. 18, 1991

[54] RELEASING DEVICE FOR A PARACHUTE

[76] Inventor: Helmut Cloth, 4790 Paderborn, Riemekester, 97a, Fed. Rep. of Germany

[21] Appl. No.: 350,376

[22] Filed: May 11, 1989

Related U.S. Application Data

[63] Continuation-in-part of Ser. No. 164,152, Mar. 4, 1988, Pat. No. 4,858,856.

[30] Foreign Application Priority Data

Mar. 6, 1987 [DE] Fed. Rep. of Germany ....... 3707294

[51] Int. Cl.$^5$ .............................................. B64D 17/70
[52] U.S. Cl. .................................... 244/147; 244/149
[58] Field of Search .................... 244/147, 149, 151 R, 244/151 A, 151 B; 441/2, 17, 18, 33

[56] References Cited

U.S. PATENT DOCUMENTS

| | | |
|---|---|---|
| 2,497,772 | 2/1950 | Horning .............................. 244/148 |
| 2,965,337 | 12/1960 | Stencel ................................ 244/148 |
| 3,023,498 | 3/1962 | Temple et al. .................. 244/151 B |
| 3,142,958 | 8/1964 | Roberts et al. ...................... 244/149 |
| 3,300,606 | 1/1967 | Starer et al. ........................ 244/149 |
| 3,462,101 | 8/1969 | Chevrier ............................. 244/148 |
| 3,722,014 | 3/1973 | Hill et al. ............................. 441/2 |
| 3,813,066 | 5/1974 | Raznov ............................... 244/149 |
| 3,820,748 | 6/1974 | McDonald ......................... 244/149 |
| 3,830,453 | 8/1974 | Cannarozzo ....................... 244/148 |
| 3,992,999 | 11/1976 | Chevrier et al. .................... 244/149 |

Primary Examiner—Sherman D. Basinger
Assistant Examiner—Stephen P. Avila
Attorney, Agent, or Firm—Sprung Horn Kramer & Woods

[57] ABSTRACT

The invention concerns a releasing mechanism for a parachute which is stowed in a container held closed by a safety string against the pulling force of a preloaded spring. This safety string is fixed to a container and can be released by action of an energy storage, e.g. a detonator or a preloaded spring. The energy set free by controlled ignition or triggering can either destroy or release the safety string.

14 Claims, 2 Drawing Sheets

RELEASING DEVICE FOR A PARACHUTE

CROSS REFERENCE TO RELATED APPLICATION

This application is a continuation-in-part application of application Ser. No. 07/164,152, filed Mar. 4, 1988, now U.S. Pat. No. 4,858,856.

BACKGROUND OF THE INVENTION

1. Field of the Invention

The invention concerns a releasing device for a parachute which is, in the state for use, folded or disposed in a receptacle and held together by a securing member against the force of an unholding preloaded spring, said releasing device having means for actuating said disconnecting means under predetermined conditions.

2. Background Information

According to the U.S. patent application Ser. No. 07/164,152, now U.S. Pat. No. 4,858,856 filed, Mar. 4, 1988, the retaining means consists of a securing string controlled by a disconnecting device which contains an energy store discharged by an electrical trigger signal. The disconnecting device is positioned in a container with holes for passage of the securing string, the holes being closed by the disconnecting device after having severed the securing string through discharge of the energy storage. The energy storage might be, e.g., a preloaded spring or a detonator acting on a cutting blade.

SUMMARY OF THE INVENTION

The objective of the invention is to provide a disconnecting device for the safety string which is not acting via a cutting device but by means of a direct separation.

The solution of this task is that the retaining means consists of a safety string positioned in a container together with the energy storage, where the safety string can be disconnected by the effect of the energy discharged.

One of the possible configurations is that the retaining means consists of a detonator which holds or contains or surrounds the safety string and sets free the safety string after ignition.

A further configuration possible is the construction of the safety string in a way that a part of it consists of a combustible material such as gun cotton, so that the energy storage is provided by the material itself which is destroyed after ignition and releases the securing string. Another configuration is that the retaining means of the safety string is a bolt and the energy storage a pre-loaded spring or a detonator which moves the bolt and thereby releases the safety string after having been triggered.

The triggering of the energy conversion in the energy storage is preferably achieved by an electric signal, but a mechanical release or percussion priming are further possibilities.

DETAILED DESCRIPTION OF THE INVENTION

Figure 1:
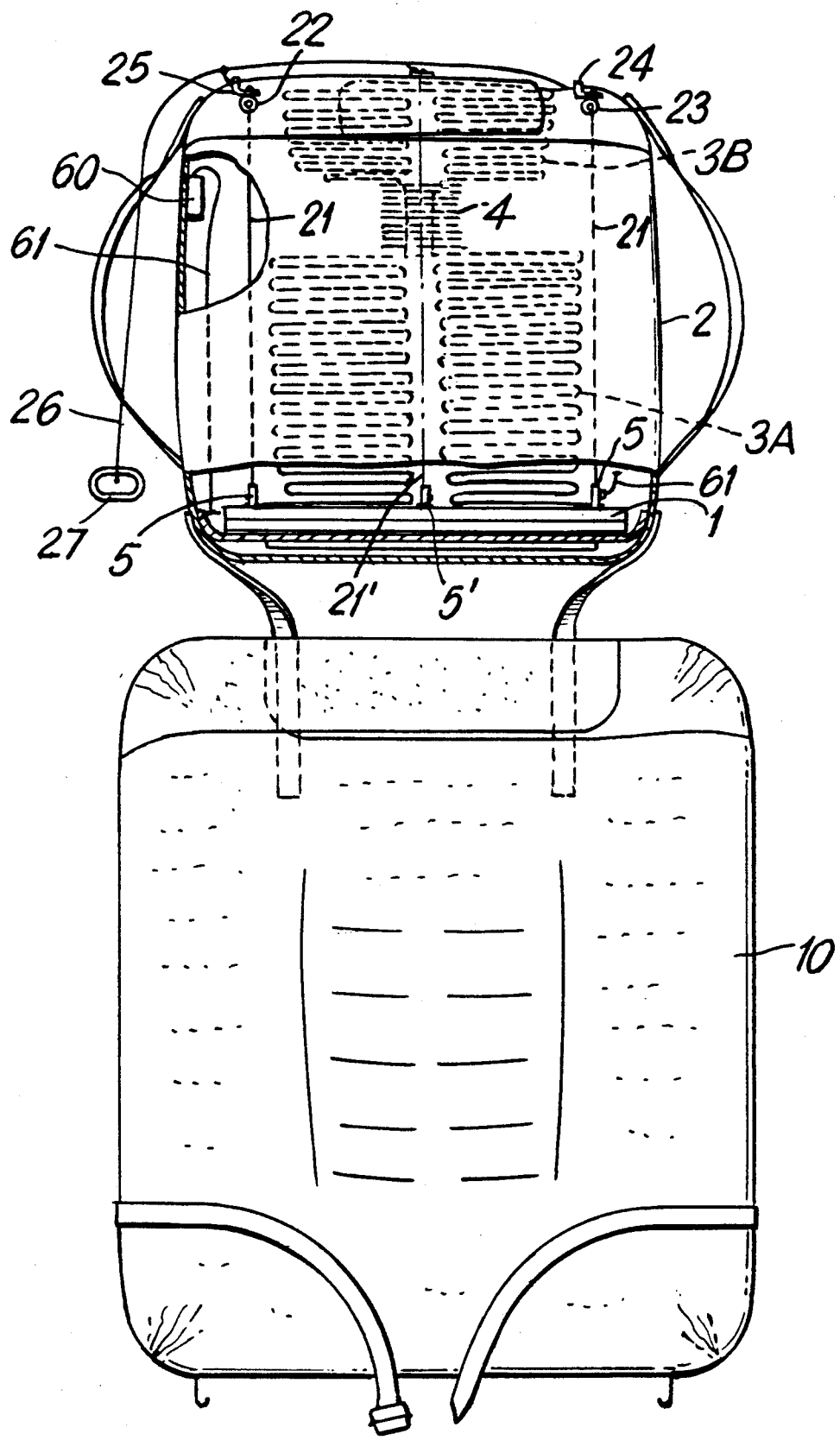
FIG. 1 is a perspective view which shows a parachute rig with a partially opened reserve canopy container.

FIG. 1 shows a parachute rig with a partially opened reserve canopy container. The upper container (2) contains the reserve canopy which is used in emergency situations. This reserve canopy (3A) is attached to a pilot chute (3B) while a spring (4) in the pilot chute (3B) serves for the deployment. Closing the system, the flaps are compressed against the spring (4) and the equipment is held together when the pins (24,25) can be removed by the skydiver pulling the handle (27), in case he is conscious. The new release device is located inside the reserve container (2) and it cuts the safety rope (21) underneath the grommets. This creates an independant mechanism for the opening. A cable connected to a display and push-button control unit (60) can be located inside or outside the container (2).

The disconnecting device (1) is located in a container (5) where the safety string enters and where it is attached.

The lower container (10) contains the main canopy which is not affected by the invention The safety string (21'), instead of being positioned on both sides, can also be placed in a central position, being connected to a rest (1) with a holder (5') and having a loop held by a pin on its other side.

Figure 2:
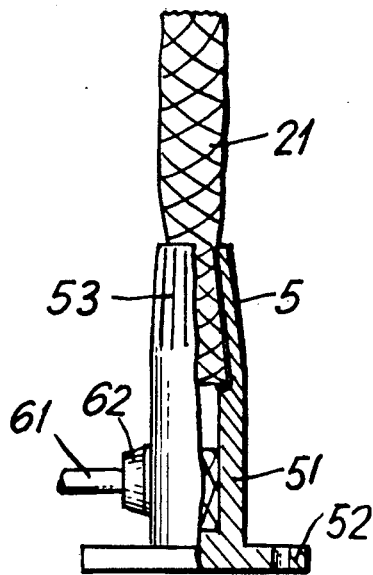
FIG. 2 is an elevational view which shows a first configuration of a detonator controlled retaining device, enlarged and shown in a partial cross-section.

FIG. 2 shows a first configuration of a disconnecting means consisting of a hollow cylindrical container (5) and a detonator. One part of the container is shown open. The container (5) is closed on one end and provided with a flange, its other side contains one end of the safety string (21) with a squeeze connector (53). An electric ignition cable (61) which is passing through a nipple (62) leads to the detonator (51). When igniting the detonator (51), the container (5) is enlarged in such a way that the squeeze connector (53) is loosened and the safety string (21) set free.

Figure 3:
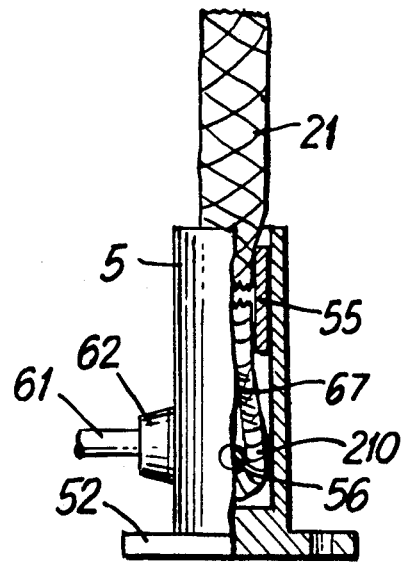
FIG. 3 is an elevational view, partly in cross-section which shows another configuration with a detonator controlled retaining device.

FIG. 3 shows another configuration of the disconnecting means in a semiopened view. It consists of a hollow cylindrical container (5) which is closed on one end and has a flange (52) for connection. The terminal section of the safety string (21) is fashioned as a loop and is made from a combustible material, e.g., gun cotton; it leads into a container (5) where it is fixed with a pin (56). The looped terminal section (210) is attached to the safety string (21) by a squeeze connector. The combustible material is surrounded by an electrical ignition coil (67) which is connected with an ignition cable (61) passing through a nipple (62) where it enters the container (5).

Figure 4:
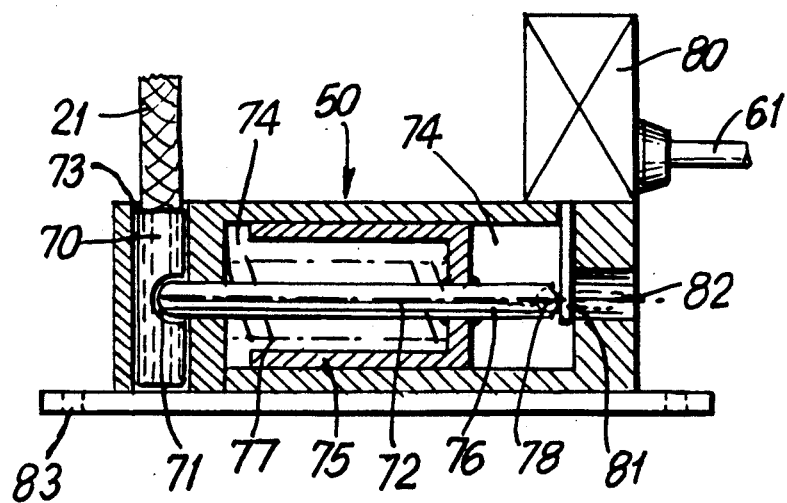
FIG. 4 shows a configuration with a spring controlled, bolt-acted retaining device in cross-section.

FIG. 4 shows a vertical cross-section of a further holding and disconnecting device in the container (50). The safety string (21) has a stopping at its end, with a boring or a notch (71) checked by a holding pin (72). The stopping (70) is located in a receptacle (73) of the container which has a cylindrical space (74) with a mobile piston (75). At one end of the piston there is a holding pin (72) and on the other end there is a supporting pin (76) in the axial direction of the piston. Around the holding pin (75), a preloaded spring (77) is placed as energy storage, attached to the piston (75) at one end and supported by the frontal part of the receptacle (73)

at the other end. The supporting pin (76) bears a ball (78) at its end which rests on a support (81) closing a boring (82) where the supporting pin (76) can enter, the support being connected to the keeper of an electric magnet (80). The electric magnet (80) can be activated via the cable (61) and then retracts the support (81). Then the supporting pin (76) can enter the boring (82) while the spring (77) unloads and pushes back the piston (75) with the holding pin (72) which sets free the stopping (70) and the safety string (21). The container (50) has flanges for attachment (83). Instead of the stopping with a boring or a notch at the end of the safety string, a loop secured by a holding pin could be added to the safety spring.

A configuration with a safety string on both sides of the parachute container allows the joining of both string ends in a holding device where they can be held and released. Furthermore, the configurations according to FIG. 2 and 3 could hold and release two strings instead of one.

I claim:

1. A releasing device for a parachute which is in a state ready for use, folded and disposed in a receptacle and held together by a securing member against the force of an unholding preloaded spring, said releasing device having means for disconnecting said securing member and control means for actuating said disconnecting means at predetermined conditions, wherein said disconnecting means comprises a breaking device for said securing member which is located in a container and an energy storage in the container and dischargeable in response to the electrical trigger signal to release said securing member by the force of the energy discharged, the energy acting on said disconnecting means is such a way that said securing member is either destroyed or released, wherein at least a part of the securing member consists of a combustible material which is the energy storage and a triggering device connected to at least part of the securing member for producing the trigger signal and comprising a cable for carrying an electric current from an ignition cable.

2. A releasing device as claimed in claim 1, wherein said container is a hollow body wherein said securing member is locked or squeezed or jammed at one end and where said container contains a detonator which is connected to a triggering device.

3. A releasing device as claimed in claim 2, wherein said container is a hollow body of cylindrical shape with an attachment flange at one side of said hollow body's bottom.

4. A releasing device as claimed in claim 2, wherein said triggering device is the ignition cable which is attached to said container with a nipple.

5. A release device as claimed in claim 2, wherein said container is locking or squeezing or jamming several of said securing member's ends.

6. A releasing device as claimed in claim 5, wherein the end of said securing member is a loop which is held by a piston inside said container.

7. A releasing device as claimed in claim 6, wherein said loop is attached to said securing member by a squeeze socket.

8. A releasing device as claimed in claim 1, wherein two of said securing members are connected with their ends with said combustible material.

9. A releasing device for a parachute which is in a state ready for use, folded and disposed in a receptacle and held together by a securing member against the force of an unholding preloaded spring, said releasing device having means for disconnecting said securing member and control means for actuating said disconnecting means at predetermined conditions, wherein said disconnecting means comprises a breaking device for said securing member which is located in a container and an energy storage in the container and dischargeable in response to an electrical trigger signal to release said securing member by the force of the energy discharged, the energy acting on said disconnecting means in such a way that said securing member is either destroyed or released and wherein said securing member is secured to said container by a mobile holding pin acting transversely to the axis of said securing member, wherein said holding pin is loaded in its axial direction towards its release by a preloaded spring comprising the energy storage and an electromagnetic locking device holds said holding pin against the load of said preloaded spring.

10. A releasing device as claimed in claim 9, wherein said securing member carries a loop or a stop with a boring or a notch which is entered or held by said holding pin.

11. A releasing device as claimed in claim 9, wherein several of said securing members are releasably held by said holding pin with loops or stops.

12. A releasing device as claimed in claim 9, wherein said holding pin is attached to a piston which is located in a cylindrical chamber and where a preloaded spring concentrically surrounds said holding pin.

13. A releasing device as claimed in claim 9, wherein said holding pin acts as a supporting pin at the other side of said piston and contains a ball which rests on said locking device.

14. A releasing device for a parachute which is in a state ready for use, folded and disposed in a receptacle and held together by a securing member against the force of an unholding preloaded spring, said releasing device having means for disconnecting said securing member and control means for actuating said disconnecting means at predetermined conditions, wherein said disconnecting means comprises a breaking device for said securing memeber which is located in a container and an energy storage in the container and dischargeable in response to an electrical trigger signal to release said securing member by the force of the energy discharged, the energy acting on said disconnecting means in such a way that said securing member is either destroyed or released and wherein said container being a hollow cylindrical body closed on one end and bearing an attachment flange, an ignition cable entering and being fixed to said container at one side and wherein several of said securing member's ends are locked or squeezed or jammed at one end, wherein each end is a loop held by a piston in the container and attached to the securing member by a squeeze socket and wherein said container contains a detonator which is connected to a triggering device.

* * * * *